US011103796B1

(12) United States Patent
McDonell

(10) Patent No.: US 11,103,796 B1
(45) Date of Patent: Aug. 31, 2021

(54) MODULAR SECURITY BRACKET METHODS AND APPARATUS FOR VIDEO GAME CONTROLLERS AND OTHER ELECTRONIC DEVICES

(71) Applicant: Colin David McDonell, Escondido, CA (US)

(72) Inventor: Colin David McDonell, Escondido, CA (US)

( * ) Notice: Subject to any disclaimer, the term of this patent is extended or adjusted under 35 U.S.C. 154(b) by 3 days.

(21) Appl. No.: 16/877,338

(22) Filed: May 18, 2020

(51) Int. Cl.
| A63F 13/98 | (2014.01) |
| E05B 73/00 | (2006.01) |
| A63F 13/24 | (2014.01) |
| A63F 13/20 | (2014.01) |
| A63F 13/92 | (2014.01) |

(52) U.S. Cl.
CPC .............. *A63F 13/98* (2014.09); *A63F 13/24* (2014.09); *E05B 73/0082* (2013.01); *A63F 13/20* (2014.09); *A63F 13/92* (2014.09)

(58) Field of Classification Search
CPC .......... A63F 13/20; A63F 13/24; A63F 13/92; A63F 13/98; E05B 73/0082
See application file for complete search history.

(56) References Cited

U.S. PATENT DOCUMENTS

| 9,285,832 B2* | 3/2016 | Galant | G06F 21/88 |
| 9,367,865 B2* | 6/2016 | Treiser | G06Q 30/0609 |
| 9,549,478 B2* | 1/2017 | Laster | B63B 49/00 |
| 9,789,390 B1* | 10/2017 | Block | A63F 13/92 |
| 9,936,823 B2* | 4/2018 | Galant | A47F 3/002 |
| 10,165,873 B2* | 1/2019 | Gulick, Jr. | E05B 73/00 |
| 10,206,522 B2* | 2/2019 | Yang | A47F 7/0246 |
| 10,448,759 B1* | 10/2019 | Chapuis | A47F 5/16 |
| 10,463,979 B2* | 11/2019 | Dornbusch | A63F 13/23 |
| 10,750,885 B2* | 8/2020 | Hyma | E05B 73/0082 |
| 10,836,304 B2* | 11/2020 | Taberner | B60Q 1/24 |
| 10,858,865 B2* | 12/2020 | Kelsch | E05B 73/0017 |
| 10,925,414 B2* | 2/2021 | Gulick, Jr. | F16M 11/041 |
| 10,956,624 B2* | 3/2021 | Roy | G08B 21/0261 |
| 11,035,151 B2* | 6/2021 | Kelsch | E05B 73/0082 |
| 2013/0178290 A1* | 7/2013 | Joynes | A63F 13/06 463/37 |
| 2014/0019241 A1* | 1/2014 | Treiser | G06Q 30/0609 705/14.53 |

(Continued)

*Primary Examiner* — William H Mcculloch, Jr.
(74) *Attorney, Agent, or Firm* — Jaquez Land Greenhaus & McFarland LLP; Bruce W. Greenhaus, Esq.

(57) ABSTRACT

Modular security bracket methods and apparatus for use with video game controllers and other relatively small and light electronic devices are disclosed. In some embodiments, the modular security bracket apparatus comprises two security brackets that are designed and shaped to fit snugly around the video game controller or other electronic device during assembly. Each embodiment of the modular security bracket apparatus is specifically designed and shaped to accommodate a video game controller or other electronic device for which it is made to secure. In some embodiments, a tethered security cable is fitted within the modular security bracket apparatus during assembly thereof. In some embodiments, the security cable is tethered to a fixed surface, such as a security wall, floor, or relatively immovable furniture or appliance, thereby preventing the video game controller, electronic device, and the modular security bracket apparatus itself from theft or loss.

21 Claims, 6 Drawing Sheets

(56) References Cited

U.S. PATENT DOCUMENTS

| | | | | |
|---|---|---|---|---|
| 2015/0312764 A1* | 10/2015 | Tuukkanen | ........ | G08B 13/1427 455/411 |
| 2016/0201359 A1* | 7/2016 | Berglund | ........... | G08B 13/1472 70/58 |
| 2017/0049251 A1* | 2/2017 | Gulick, Jr. | ............. | A47F 7/0246 |
| 2017/0144590 A1* | 5/2017 | Taberner | ................. | B60Q 1/24 |
| 2017/0189800 A1* | 7/2017 | Crain | ...................... | A63F 13/24 |
| 2018/0036635 A1* | 2/2018 | Townley | ............... | G06F 1/1692 |
| 2018/0279809 A1* | 10/2018 | Regan | ....................... | A47F 5/13 |
| 2019/0125104 A1* | 5/2019 | Gulick, Jr. | ............. | G08B 13/14 |
| 2019/0228189 A1* | 7/2019 | Roy | .................... | E05B 73/0082 |
| 2020/0040614 A1* | 2/2020 | Kelsch | ................ | E05B 73/0017 |
| 2020/0128973 A1* | 4/2020 | Hedderich | .......... | A47F 7/024 |
| 2020/0347648 A1* | 11/2020 | Moock | ................ | E05B 73/0082 |
| 2020/0359811 A1* | 11/2020 | Hyma | ................ | E05B 73/0082 |
| 2021/0040779 A1* | 2/2021 | Kelsch | ................ | E05B 73/0023 |
| 2021/0059437 A1* | 3/2021 | Chapuis | .................... | A47F 5/10 |
| 2021/0123268 A1* | 4/2021 | Gulick, Jr. | ............ | F16M 11/041 |
| 2021/0169239 A1* | 6/2021 | Gulick, Jr. | ............ | F16M 11/041 |

* cited by examiner

MODULAR SECURITY BRACKET METHODS AND APPARATUS FOR VIDEO GAME CONTROLLERS AND OTHER ELECTRONIC DEVICES

BACKGROUND

(1) Technical Field

The presently disclosed methods and apparatus is related to security brackets, and more specifically to modular security brackets for use with video game controllers and other electronic devices requiring security from theft and loss.

(2) Background

Console video games are ubiquitous in modern society. As is well known, video game consoles are standardized computing devices specifically designed for use in video gaming. Some of the more popular console video games include the well-known Xbox™ PlayStation™ and Wii™ console video games. Modern video game consoles or players are highly versatile multi-function systems. In addition to their primary purpose of being video game platforms, they can be used for HD quality video streaming and internet surfing. This makes video game consoles a popular and cost-effective solution for entertainment options wherever they are used.

The video game consoles typically utilize a monitor or television as output display devices and video game controllers as input devices. Video game controllers provide the means by which players interact with the video game executed by the video game console. The video game controllers provide an immersing experience whereby the video game controllers are mere extensions of the player actions and interactions with the video game. Although many electronic systems, such as personal computers, television monitors, video game consoles, and the like, are housed in private settings such as private residences, more and more frequently they are being installed in public places. Unfortunately, this sometimes leads to theft of such systems and their components, such as video game controllers. While video game consoles can be relatively easily secured inside a locked cabinet or similar security apparatus to prevent its removal, video game controllers, in contrast, owing to their relatively small size and weight, are more difficult to secure from theft and loss. Also, because ease of use and unhindered access by the user must be maintained in order to allow the user to enjoy the video gaming experience, any attempts at securing video game controllers from loss or theft should not negatively impact or hinder interactions with the controllers by the video gamers. Disadvantageously, presently available video controller security apparatus fall short in both preventing loss or theft of the controllers and/or allowing video gamers unhindered and unfettered access to the video game controllers and their associated video game interaction mechanisms.

Therefore, there is a need for apparatus and methods providing security of video game controllers from loss and theft while providing unhindered and unfettered access to the video game controllers and their associated video game interaction mechanisms. The presently disclosed video game controller security brackets provides such apparatus and methods for securing video game controllers and other electronic devices from theft and loss.

SUMMARY

Modular security bracket methods and apparatus designed for use with video game controllers or other electronic devices are disclosed. In some embodiments, the modular video game controller security bracket apparatus comprises two major security brackets, a "rear facing" security bracket and a "front facing" security bracket. In some embodiments, both of the security brackets comprise injected molded plastic infused with glass fiber for improved strength. Each embodiment of the modular security bracket apparatus is specifically designed and formed to accommodate a video game controller or other electronic device for which it is made to secure from theft and loss. The front facing security bracket is designed to accommodate a front facing part of the video game controller or other electronic device that faces towards the video game user or user of the electronic device. The rear facing security bracket is designed to accommodate a rear facing part of the video game controller or other electronic device that faces away from the video game user or user of the electronic device.

In one embodiment, the front and rear facing security brackets are fitted around the video game controller or other electronic device during assembly of the modular security bracket apparatus. A tethered security cable is also fitted within the modular security bracket apparatus during assembly thereof. Once the tethered security cable is positioned between the front and rear facing security brackets, the brackets are coupled together around the video game controller and firmly attached to each other. In one embodiment, the front and rear facing security brackets are coupled together using an insert screw sleeve and modular security bracket screw specifically made to mate the two components together.

In some embodiments, the security cable includes a security cable stop affixed to a first end of the security cable preventing removal of the security cable from the modular security bracket apparatus. In some embodiments, a loop is formed at the first end of the tethered security cable and the loop is used to implement the security cable stop feature. In yet some other embodiments, the second end of the tethered security cable has an eyelet attached thereto. The eyelet permits the tethered security cable to be affixed to any stable surface or relatively immovable object using a security screw thereby preventing the theft or loss of the assembled modular security bracket and the video game controller or other electronic device secured therein. In some other "looped" configuration embodiments, loops are formed in both the first and second ends of the tethered security cable. In these embodiments, the tethered security cable is threaded through channels formed into both the front facing and rear facing security brackets and the tethered security cable is secured to the stable surface or other relatively immovable object, such as a large piece of furniture, using the loops formed in both ends.

Due to the modular nature of the disclosed modular security bracket apparatus, it can be molded, retooled and remolded to accommodate and secure virtually any type of video game controller or other electronic device, many of which are shaped very differently from each other. Virtually any video game controller or electronic device (such as television remote controls, for example) can be secured using the modular security bracket apparatus of the present disclosure. Thus, such variously shaped electronic modular security bracket apparatus fall within the scope of the present disclosure.

The details of one or more embodiments of the invention are set forth in the accompanying drawings and the description below. Other features, objects, and advantages of the invention will be apparent from the description and drawings, and from the claims.

DESCRIPTION OF THE DRAWINGS

Like reference numbers and designations in the various drawings indicate like elements.

DETAILED DESCRIPTION

Embodiments of the disclosed method and apparatus are useful in securing video game controllers and other "hand-held" electronic devices from theft and loss. Details of some disclosed embodiments are described below with reference to the accompanying figures.

Figure 1:
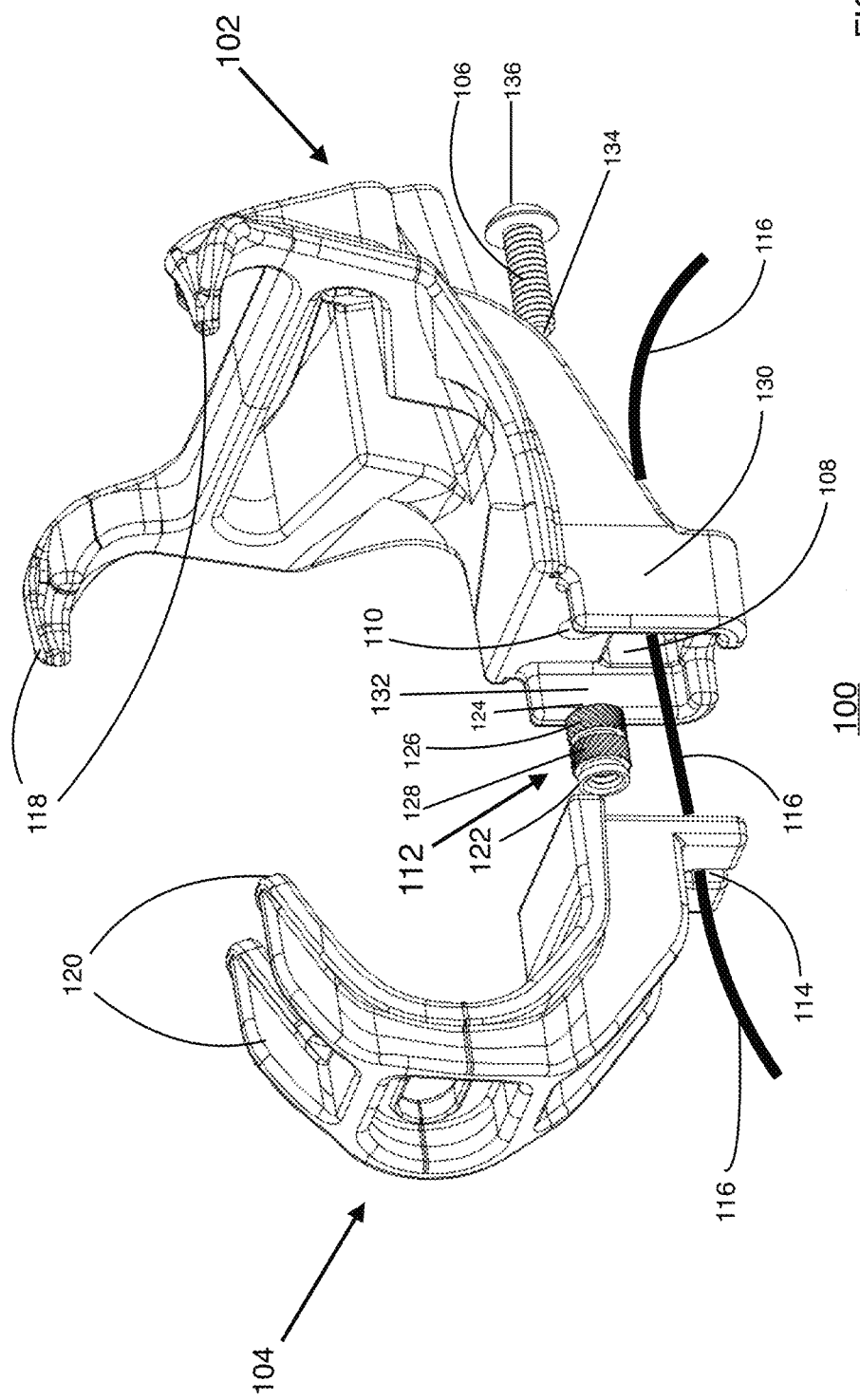
FIG. 1 is a side perspective wireframe drawing of one embodiment of an unassembled modular video game controller security bracket apparatus in accordance with the present disclosure.

FIG. 1 is a side perspective wireframe drawing of one embodiment of an unassembled modular video game controller security bracket apparatus 100 of the present disclosure. As shown in FIG. 1, in some embodiments, the modular security bracket apparatus 100 comprises two major security brackets, a "rear facing" security bracket 102 and a "front facing" security bracket 104. The terms "front facing" and "rear facing" are determined from the perspective of the user of the video game controller. Specifically, the front facing security bracket 104 is attached and configured to accommodate a front facing part of the video game controller (see FIG. 5). The rear facing security bracket 102 is attached and configured to accommodate a rear facing part of the video game controller.

In some embodiments, both of the security brackets 102, 104 comprise injected molded plastic infused with glass fiber for improved strength. In some embodiments, the security brackets 102, 104 are fabricated such that the apparatus 100 has a minimum flexural modulus (ability to resist deformation under load) of 8700 MPa (mega pascals). In some embodiments, the brackets are fabricated with material exhibiting minimum tensile stress (ability to resist breaking under load) of 130 MPa (mega pascals). However, as is known to those of ordinary skill in the manufacturing arts, other methods of manufacturing the security brackets 102, 104 may be used and fall within the scope of the presently disclosed modular security bracket apparatus 100. For example, in some embodiments the security brackets 102, 104 may comprise high strength metal material that can conveniently be formed as described herein to accommodate and secure a video game controller, other electronic device, and similar devices. Also, in some embodiments wherein the security brackets comprise injected molded plastic infused with glass fiber, different percentages of glass fiber material may be used in making different portions of the security brackets 102, 104. For example, in some embodiments, a higher percentage of glass fiber may be infused in the rear facing security bracket 102 than is infused in the front facing security bracket 104. In such embodiments, the higher percentage of glass fiber infused in the rear facing security bracket 102 prevents thieves from bending or prying the rear facing bracket 102 off and away from the top of the video game controller or other electronic device.

As described below in more detail with reference to FIG. 5, the security brackets 102, 104 are specifically designed and molded to securely custom-fit the electronic device or video game controller (such as the video game controller 560 of FIG. 5).

Referring again to FIG. 1, the front and rear facing security brackets 104, 102 are designed to be joined and assembled together to form a single modular security bracket apparatus 100. Before assembly, a video game controller (such as the video game controller 560 shown in FIG. 5 and described below in more detail) is first placed in between the two security brackets 102, 104. The front facing security bracket 104 is fitted around a front facing part of the video game controller. The rear facing security bracket 102 is similarly positioned around a rear facing part of the video game controller. In accordance with the present disclosure, and as noted briefly above, each embodiment of the present modular security bracket apparatus 100 is specifically designed and formed to securely accommodate a video game controller or other electronic device, thereby securing the video game controller or electronic device from theft or loss. For example, and as shown in FIG. 5, the modular security bracket apparatus (100 in FIGS. 1 and 300 in FIG. 5) is specifically designed and formed to accommodate a PlayStation 4™ video game controller (such as, for example, the video game controller 560 of FIG. 5).

Figure 2:
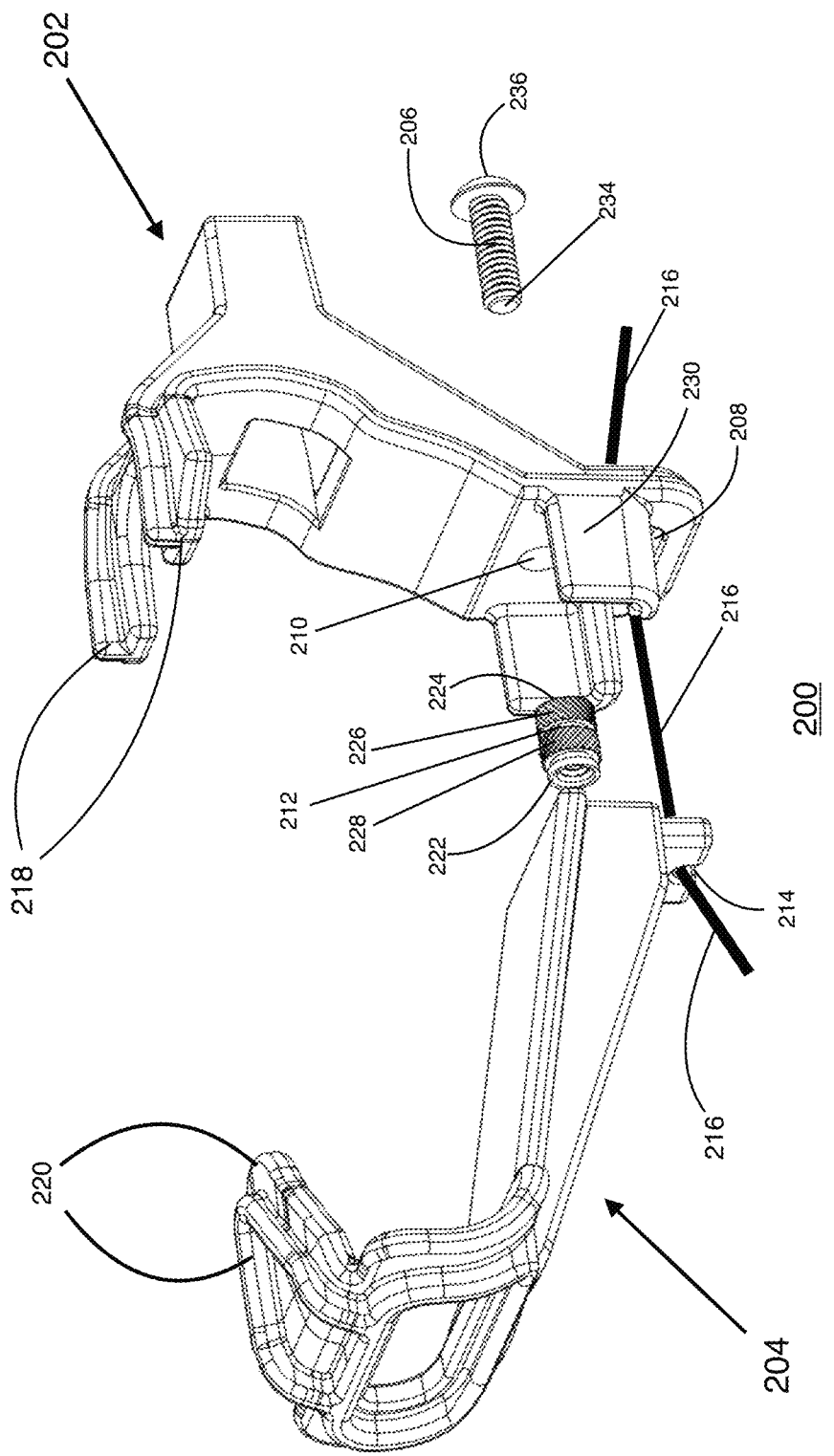
FIG. 2 is a side perspective wireframe drawing of another embodiment of an unassembled modular video game controller security bracket apparatus in accordance with the present disclosure.

In accordance with some embodiments of the modular security bracket apparatus 100, an insert screw sleeve 112 is used in mechanical cooperation with a security bracket screw 106 to hold the two security brackets 102, 104 firmly together. As shown in FIGS. 1 and 2, the insert screw sleeve 112 is threaded on its inner diameter to accommodate and mate with the security bracket screw 106. Prior to assembly of the modular security bracket apparatus 100, a front facing end 122 of the insert screw sleeve 112 is inserted into a mounting insert hole (not shown in the figures) just above a front facing cable channel 114 and near the bottom of the front facing security bracket 104. The mounting insert hole is proportioned to permit the insert screw sleeve 112 to be inserted within the hole. As shown in FIGS. 1 and 2, in some embodiments the insert screw sleeve 112 includes knurling grooves or patterns 128, 126 (228, 226 in FIG. 2) on its exterior surface extending from the approximate middle of the insert screw sleeve 112 to both of its ends 122, 124, (ends 222, 224 in FIG. 2) respectively. The shape of the knurling patterns 126, 128 are not for aesthetic purposes, but instead determine the resistance the insert screw sleeve 112 has against being intentionally or inadvertently removed from the mounting insert hole. The knurling patterns 126, 128 also help in preventing unintentional destruction of the front facing security bracket 104, the mounting insert hole, or its surrounding plastic material, that may be caused if too much torque is applied to the security bracket screw 106 during assembly of the modular security bracket apparatus 100.

In some embodiments, the insert screw sleeve 112 is pressed into place within the mounting insert hole and then heated (usually using a soldering iron). The heating of the insert screw sleeve 112 causes the plastic molding surrounding the mounting insert hole to mold, upon cooling, against the insert screw sleeve 112 until it is firmly set in place within the mounting insert hole near the bottom of the front facing security bracket 104. In other embodiments, the insert screw sleeve 112 may comprise an ultrasonic or heat staking insert screw sleeve. In such embodiments, the insert screw sleeve 112 is inserted within the mounting insert hole using ultrasonic insertion equipment while a high frequency vibration is simultaneously applied to the insert screw sleeve 112. In such embodiments, frictional heat caused by the high frequency vibration melts the plastic surrounding the mounting insert hole allowing easy installation of the insert screw sleeve 112 therein. When the vibration ceases, the surrounding plastic of the front facing security bracket 104 solidifies, locking the insert screw sleeve 112 in place within the mounting insert hole. In other embodiments, the insert screw sleeve 112 is installed within the mounting insert hole by simply pressing the insert screw sleeve 112 within the mounting insert hole using a thermal press that melts the plastic surrounding the mounting insert hole. In yet other embodiments of the modular security bracket apparatus 100, the insert screw sleeve 112 comprises a "molded in" insert screw sleeve which is installed during the plastic injection molding process by which the front facing security bracket 104 is manufactured. In some other embodiments, a tapped hole is created in the front facing security bracket 104. In these embodiments, the tapped hole implements the mounting insert hole into which the insert screw sleeve 112 is inserted.

In any of these embodiments, once the insert screw sleeve 112 is mounted within the mounting insert hole, it is held firmly in place within the front facing security bracket 104. A rear facing end 124 of the insert screw sleeve 112 has "female" screw grooves formed within the interior diameter of the insert screw sleeve 112 and are designed to mechanically mate with "male" screw grooves of the security bracket screw 106. During assembly of the modular security bracket apparatus 100, a video game controller or other electronic device that the security brackets 102, 104 are designed to secure, is positioned into place between the two security brackets 102, 104. As shown in both FIGS. 1 and 2, a tethered security cable 116 (216 in FIG. 2) is threaded through the front facing cable channel 114 (214 in FIG. 2) at the bottom of the front facing security bracket 104 (204 in FIG. 2) and through a rear facing cable channel 108 (208 in FIG. 2) positioned near the bottom of the rear facing security bracket 102 (202 in FIG. 2). In some embodiments, the tethered security cable 116, 216 comprises ⅛" "aircraft quality" steel braided cable that may be coated in vinyl, and in some embodiments the security cable is coated with black vinyl.

Figure 3:
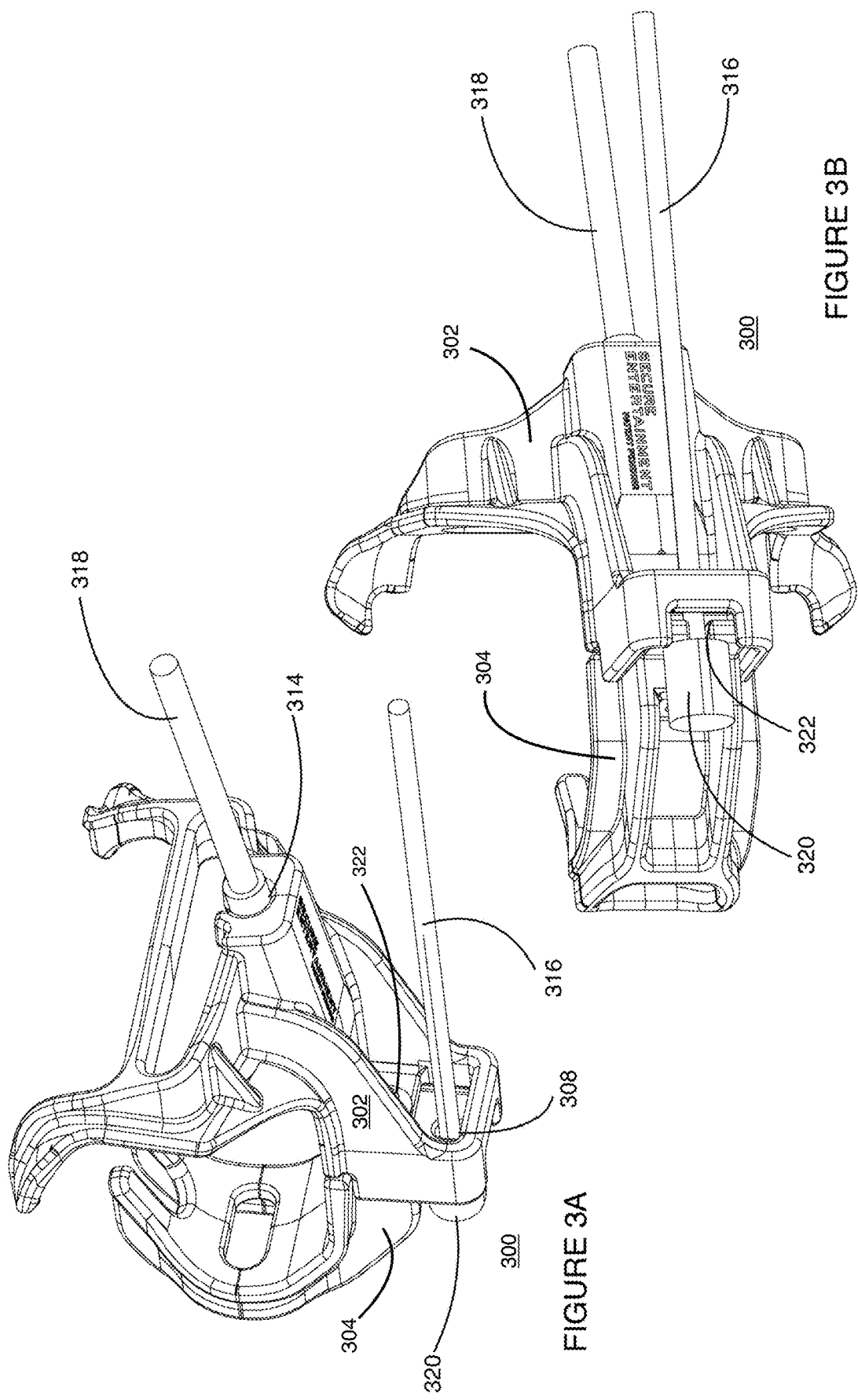
FIG. 3A is a perspective wireframe drawing of a fully assembled modular video game controller security bracket apparatus (shown unassembled in FIG. 1) showing a rear-facing bottom perspective view of the modular security bracket apparatus described above with reference to FIG. 1.
FIG. 3B is a perspective wireframe drawing of the fully assembled modular video game controller security bracket apparatus of FIG. 3A showing a bottom perspective view of the modular security bracket apparatus.
Figure 4:
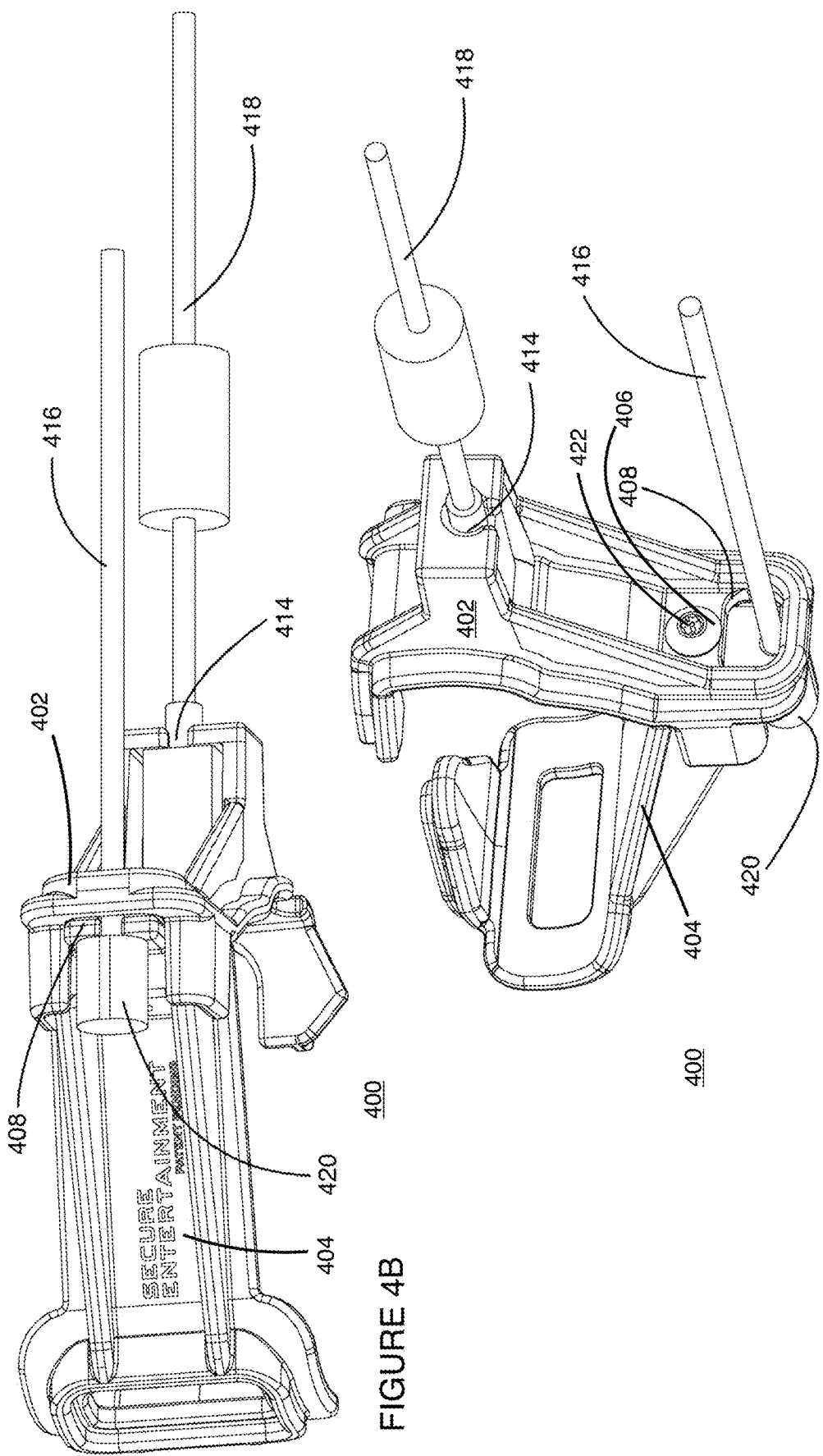
FIG. 4A is a perspective wireframe drawing of a fully assembled modular video game controller security bracket apparatus (shown unassembled in FIG. 2) showing a rear-facing bottom perspective view of the modular security bracket apparatus described above with reference to FIG. 2.
FIG. 4B is a perspective wireframe drawing of the modular video game controller security bracket apparatus of FIG. 4A showing a bottom perspective view of the modular security bracket apparatus.

Although not shown in FIGS. 1 and 2, the portion of the tethered security cable 116 (216 in FIG. 2) that extends beyond the front facing side of the front facing security bracket 104 includes a security cable stop (such as, for example, the security cable stops 320 and 420 shown in FIGS. 3B and 4B, respectively) permanently affixed to a first end of the tethered security cable 116, 216. In some embodiments, the security cable stops comprise aluminum cable stops that are swaged onto the first end of the tethered security cable. In these embodiments, the aluminum cable stops are swaged onto the security cable by applying pressure thereto sufficient to permanently secure the cable stop to the security cable. The security cable stops (such as the security cable stops 320 and 420 of FIGS. 3B and 4B, respectively) prevent the tethered security cable 116 from being pulled through the front facing bracket 104 after assembly. A front facing cable channel 114 is formed at the bottom of the front facing security bracket 104. While the front facing cable channel 114 allows the security cable 116 to be easily inserted therethrough, it prevents the security cable stop 320 (and consequently the security cable 116) from being withdrawn from the security brackets 102, 104 after assembly thereof into a single modular security bracket apparatus.

The second end of the tethered security cable 116 is typically attached to a fixed surface, such as a security wall or floor, or relatively immovable furniture or similar object, thereby preventing the video game controller, electronic device, and the modular security bracket apparatus 100 itself from being lost or stolen. In some embodiments, the second end of the security cable 116 (shown extending away from the rear facing security bracket 102) has an eyelet attached thereto. The eyelet permits the security cable 116 to be affixed to any stable or secure surface or wall using a security screw (not shown). This prevents the entire assembled modular security bracket apparatus 100, and the electronic device or video game controller secured thereby, from theft or removal from an installed location. As noted above, in some embodiments, a loop is formed at the first end of the security cable. The loop formed at the first end implements the security cable stop feature in this embodiment and prevents the tethered security cable 116 from being removed from the assembled modular security bracket apparatus 100. In some embodiments (not shown in the FIGURES), a loop is formed at the second end of the tethered security cable 116. In these embodiments, the loop formed at the second end of the tethered security cable 116 allows the security cable 116 to be attached to a secure surface or wall or similar relatively immovable object. In some of these "looped" end embodiments, the tethered security cable 116 may be threaded through the loop at the second end before being attached to the modular security bracket apparatus. In some other looped end embodiments, the first end of the tethered security cable is threaded through channels 114, 108 formed in the front and rear facing security brackets and both the first end has a loop formed therein and the second end of the tethered security cable 116 also has a loop formed therein. The two loops allow the first and second ends of the tethered security cable 116 to be attached to a secure surface, wall, or other secure object such as a relatively immovable piece of furniture thereby securing the video game controller or other electronic device from theft or loss.

Referring again to FIGS. 1 and 2, the front facing security bracket 104 and rear facing security bracket 102 are positioned around the video game controller (such as the video game controller 560 shown in FIG. 5) or other electronic device and mated together by moving the two security brackets 102, 104 toward each other and around the video game controller. In the embodiment shown in FIG. 1, the front facing security bracket 104 includes front facing attachment prongs 120 and the rear facing security bracket 102 includes rear facing attachment prongs 118. The attachment prongs 118, 120 are molded and shaped to fit securely and firmly around the video game controller or other electronic device when the security brackets 102, 104 are mated and assembled together to form a single modular security bracket apparatus 100.

As shown in FIG. 1, the rear facing bracket 102 includes front facing guide walls 130, 132 that fit around their counterpart components in the front facing bracket 104. Once the two brackets 102, 104 are positioned together around the video game controller or other electronic device, the brackets 102, 104 are then mated together into a single modular security bracket apparatus 100 using the insert screw sleeve 112 and the security bracket screw 106. When the security brackets 102, 104 are fitted together around the video game controller or other electronic device, the front facing end 134 of the security bracket screw 106 is inserted through a security through hole 110 formed in the rear facing security bracket 102. The security bracket screw 106 is then inserted into the insert screw sleeve 112 and mated with the interior diameter "female" screw grooves within the insert screw sleeve 112. Those skilled in the plastic injection molding and manufacturing arts shall appreciate and understand that the modular security bracket apparatus can be designed to accommodate more than one security bracket screw 106. A plurality of security bracket screws may be used (together with their associated and corresponding insert screw sleeves) to firmly attach the security brackets 102, 104 together. The number of security brackets and insert screw sleeves that are used is a design choice left to the modular security bracket apparatus and system designer. The present modular security bracket apparatus thereby allows flexibility in the modular security bracket designs, uses and applications.

In some embodiments, the security bracket screw, 106 in FIG. 1, and 406 in FIG. 4A, has a custom-shaped screw head 422 formed within the interior of a rear facing view of the security bracket screw 406. The custom-shaped screw head 422 prevents unauthorized disassembly of the modular security bracket apparatus 100, 200, 400. During assembly, the security bracket screw 106 is screwed into the insert screw sleeve 112 using a custom-shaped screw head tool that is specifically shaped to accommodate the shape of the screw head 422 (best shown in the figures in FIG. 4A) formed into a rear facing end 136, 236 of the security bracket screw 106, 206, respectively. Such a custom-shaped screw head 422 is best shown in FIG. 4A. In some embodiments, the screw head 422 of the security bracket screw is "star" shaped to prevent unauthorized tampering therewith. As those of ordinary skill in the mechanical and manufacturing arts shall recognize, the custom-shaped screw head 422 may be configured in different shapes and sizes to prevent the modular security bracket apparatus 100, 200 from being disassembled by unauthorized persons. In some embodiments, for example, the security bracket screw 106 is fabricated using stainless steel and is compatible with a Torx™ T15 security screwdriver to prevent unauthorized removal using most common types of screwdrivers, such as Philips or flat-headed screwdrivers. In some embodiments, the screwdriver bit used to screw the security bracket screw 106 comprises a TORX™ 15 PIN IN Security Bit.

FIG. 2 is a side perspective wireframe drawing of another embodiment of an unassembled modular video game controller security bracket apparatus 200 in accordance with the present disclosure. The majority of the components of the modular security bracket apparatus 200 of FIG. 2 are very similar, if not identical, to those of the modular security bracket apparatus 100 of FIG. 1. Therefore, these components are not described in much further detail herein. For example, the insert screw sleeve 212 is identical and performs the same as the insert sleeve 112 shown in FIG. 1. Similarly, the security bracket screw 206 of FIG. 2 is identical to and performs the same as the security bracket screw 106 of FIG. 1. The rear and front facing security brackets 202, 204 are assembled together to form the modular security bracket apparatus 200 in the same manner described above with reference to the modular security bracket apparatus 100 of FIG. 1.

However, as shown in FIG. 2, the front facing attachment prongs 220 are shaped differently than are the front facing attachment prongs 120 of the modular security bracket apparatus 100 described above with reference to FIG. 1. Similarly, the rear facing attachment prongs 218 are shaped differently than the rear facing attachment prongs 118 of FIG. 1. The front facing security bracket 204 of FIG. 2 is shaped somewhat different than the front facing security bracket 104 of FIG. 1. The rear facing security bracket 202 of FIG. 2 is similarly shaped somewhat different than the rear facing security bracket 102 of FIG. 1. The security brackets 202, 204 and their respective attachment prongs 218, 220 are shaped different than their counterpart components of FIG. 1 because they are specifically custom-shaped to fit firmly with the video game controller or other electronic device that the modular security bracket apparatus 200 is designed to secure. Specifically, in the embodiment of FIG. 2, the modular security bracket apparatus 200 is designed and shaped to fit firmly with an XBOX™ One video game controller. As such, due to the modular nature of the presently disclosed modular security bracket apparatus 100, 200, it can be molded, retooled and remolded to accommodate virtually any type of video game controller or other electronic device. Therefore, although certain video game controllers are described herein for use with the present modular security bracket apparatus, virtually any video game controllers or electronic devices (such as television remote controls, for example) can be secured using the modular security bracket apparatus of the present disclosure. Thus, such variously shaped modular security bracket apparatus fall within the scope of the present disclosure.

Referring now to FIGS. 3A and 3B, additional aspects of the modular security bracket apparatus 100 (modular security bracket apparatus 300 in FIGS. 3A and 3B) of FIG. 1 are described. FIG. 3A is a perspective wireframe drawing of a fully assembled modular video game controller security bracket apparatus 300 (shown unassembled in FIG. 1) showing a rear-facing bottom perspective view of the modular security bracket apparatus 300. FIG. 3B is a perspective wireframe drawing of the fully assembled modular video game controller security bracket apparatus 300 of FIG. 3A showing a bottom perspective view of the modular security bracket apparatus 300. As shown in both FIGS. 3A and 3B, the modular security bracket apparatus 300 is assembled by affixing and attaching the front and rear facing security brackets 304, 302, respectively, together using the insert screw sleeve and security bracket screw described above with reference to the modular security bracket apparatus shown in FIGS. 1 and 2. The bottom perspective views of the modular security bracket apparatus 300 shown in FIGS. 3A and 3B show additional details of the tethered security cable 316 (referred to as the tethered security cables 116 and 216 in FIG. 1 and FIG. 2, respectively) and the security cable stop 320 that is affixed to a first end of the tethered security cable 316.

As described above with reference to the modular security bracket apparatus of FIGS. 1 and 2, the security cable stop 320 prevents the tethered security cable 316 from being inadvertently or intentionally removed from the modular security bracket apparatus 300. As noted above, the second end of the tethered security cable 316 is, in some embodiments, attached to a fixed security surface, such as to a wall or floor, thereby preventing the video game controller, electronic device, and the modular security bracket apparatus 300 from being stolen or lost. In some embodiments of the modular security bracket apparatus 300, a rear facing communication link channel 314 is formed into the rear facing security bracket 302 and positioned above the tethered security cable 316. The rear facing communication link channel 314 permits a communication link or communication wire 318 to access and connect with a communication link interface of the video game controller or other electronic device. In some embodiments, the communication link 318 comprises a Universal Serial Bus (USB) communication cable that allows the video game controller to communicate with its associated video game console. The USB cable 318 can be used for charging of the video game controller and for data transfer between the controller and the video game console. In some embodiments, the communication link 318 extends in a rear facing direction away from the modular security bracket apparatus 300 and toward the video game console (not shown in the figures).

Those skilled in the electronics arts shall recognize and appreciate that some video game controllers (and other electronic devices) do not require a wired communication link with their associated and corresponding video game console or computing device. For example, many remote control devices are in wireless communication with the devices they are used to control. Similarly, video game controllers may be devised that wirelessly communicate with their associated video game consoles. In such cases, the modular security bracket apparatus 300 would not require the communication link channel 314 and could be modified not to include such a communication link channel.

As described above with reference to the modular security bracket apparatus 100 and 200 of FIGS. 1 and 2, respectively, prior to mating the front and rear facing security brackets 304, 302, respectively, the security cable 316 is guided through a rear facing cable channel 308 positioned near the bottom of the rear facing security bracket 302. Once the security brackets 302, 304 are mated together and affixed to one another to form a single modular security bracket apparatus 300, the security cable stop 320 slides into a cable stop notch 322 thereby preventing interference by the security cable 316 with the user while the user is interacting with the video game controller or other electronic device. Similarly, as shown best in FIG. 3A, the rear facing communication link channel 314 is used to guide the communication link 318 (such as, a USB cable, in some embodiments) and prevent detachment of the communication link 318 from the video game controller or other electronic device with which the communication link is attached.

Referring now to FIGS. 4A and 4B, FIG. 4A is a perspective wireframe drawing of a fully assembled modular video game controller security bracket apparatus 400 (shown unassembled in FIG. 2) showing a rear-facing bottom perspective view of the modular security bracket apparatus 400. FIG. 4B is a perspective wireframe drawing of the modular video game controller security bracket apparatus 400 of FIG. 4A showing a bottom perspective view of the modular security bracket apparatus (shown unassembled as modular security bracket apparatus 200 in FIG. 2).

The majority of the components of the modular security bracket apparatus 400 of FIGS. 4A and 4B are very similar if not identical to those of the modular security bracket apparatus 300 of FIGS. 3A and 3B, and therefore are not described in much further detail herein. For example, the tethered security cable 416 is identical to and performs identically to the tethered security cables 116, 216, and 316 described above with reference to FIGS. 1, 2, 3A and 3B. Similarly, the modular security bracket apparatus 400 is assembled using the insert screw sleeve 212 (see FIG. 2) and the security bracket screw 406 and its associated screw head 422 whereby the security bracket screw 406 is screwed into the insert screw sleeve holding the security brackets 402, 404 firmly attached to one another.

As shown in FIGS. 4A and 4B, the modular security bracket apparatus 400 is similarly if not identically shaped as the modular security bracket apparatus 200 of FIG. 2. The security brackets 402, 404, and their respective attachment prongs, are shaped differently than are their counterpart components of the security brackets 302, 304 shown in FIGS. 3A and 3B (and, i.e., the security brackets 102, 104 of FIG. 1). As described above with reference to the differences between the modular security bracket apparatus 100 and 200, the modular security bracket apparatus shown in FIGS. 4A and 4B are specifically custom-shaped to fit firmly together with the video game controller or other electronic device that the modular security bracket apparatus 400 is designed to secure. Specifically, in the embodiment of FIGS. 4A and 4B (similar to that of FIG. 2), the modular security bracket apparatus 400 is designed and shaped to snugly fit, accommodate and secure an XBOX™ One video game controller.

Figure 5:
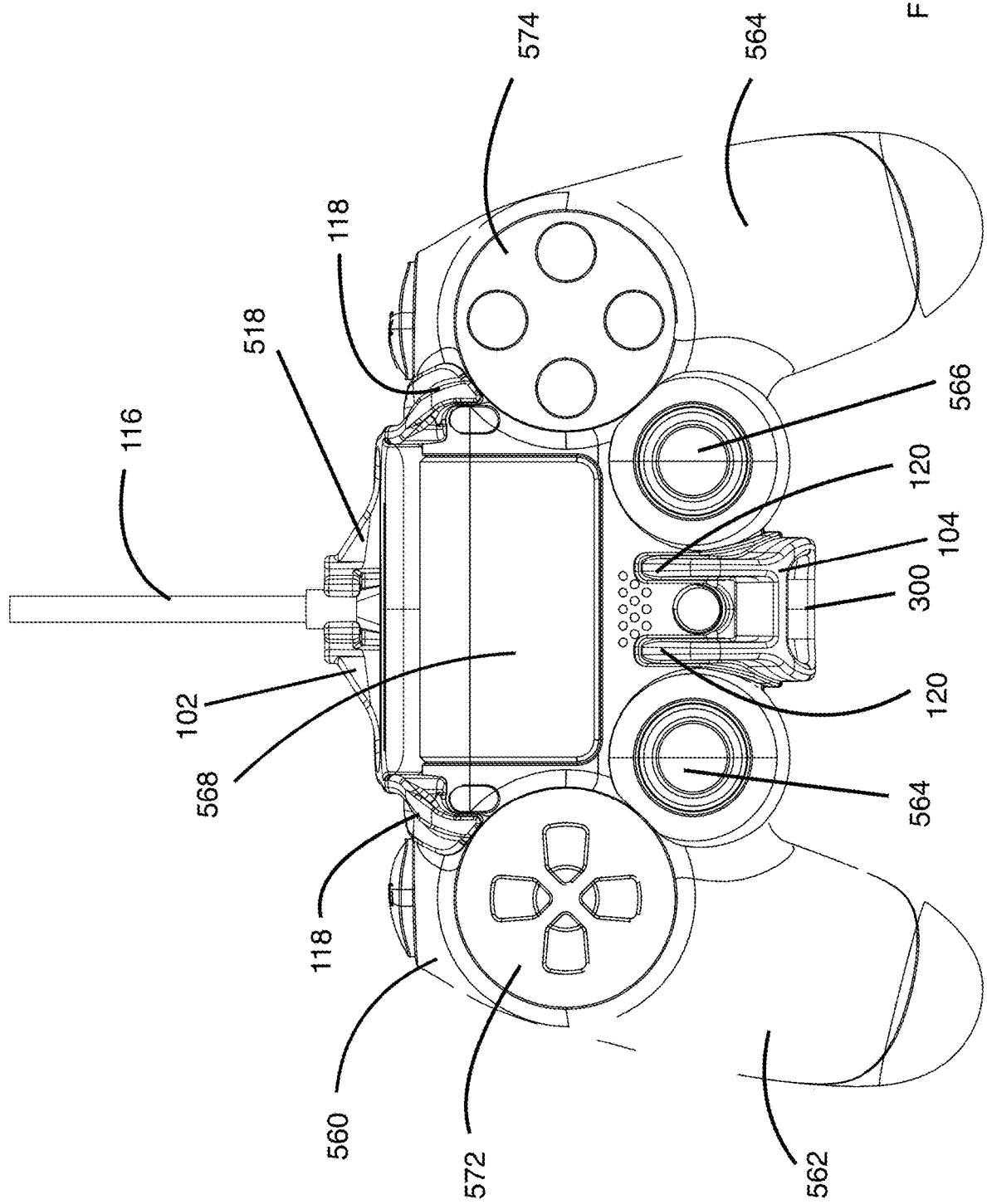
FIG. 5 is a top view wireframe drawing of the modular video game controller security bracket apparatus of FIGS. 1, 3A, and 3B, shown attached to a video game controller.

FIG. 5 is a top view wireframe drawing of the modular video game controller security bracket apparatus of FIGS. 3A and 3B (and FIG. 1) shown attached to a video game controller 560. As shown in FIG. 5, the modular security bracket apparatus 300 is specifically designed and formed to accommodate a PlayStation 4™ video game controller 560. As shown in FIG. 5, the modular security bracket apparatus 300 includes front facing attachment prongs 120 and rear facing attachment prongs 118 that secure the video game controller 560 from theft or loss. The attachment prongs 118, 120 are molded and shaped to fit securely around the video game controller 560 or another electronic device. As described above with reference to the previous figures, the modular security bracket apparatus 300 also includes a tethered security cable 116 that has a second end that is tethered to a fixed surface, such as a security wall or floor, thereby preventing the video game controller, electronic device, and the modular security bracket apparatus 300 from being lost or stolen.

Importantly, the disclosed modular security bracket apparatus 300 allows unfettered and unhindered interaction by the video game user with the video game controller and its many user interactive mechanisms. For example, the video game controller 560 has several interactive mechanisms including a left hand trigger (or "paddle") 562, a right hand trigger (or "paddle") 564, a left interactive button panel 572, a right interactive button panel 574, a left joystick 564, a right joystick 566 and a tracking touchpad 568. Due to the modular and custom-made nature of the disclosed modular security bracket apparatus 100, 200, 300, and 400, the video game user has unhindered and uninterrupted access to all of the video game controller 560 user interactive mechanisms.

This is an important advantage of the present modular security bracket apparatus as compared with presently available video game controller security mechanisms. Also, owing to its custom design and shape, the modular security bracket apparatus 300 includes an output opening 518 (shown better in FIG. 6) that allows light or infrared electromagnetic radiation that is output by the video game controller 560 to be received by the video game console or other input device. This aspect of the present modular security bracket apparatus 300 is now described with reference to FIG. 6.

Figure 6:
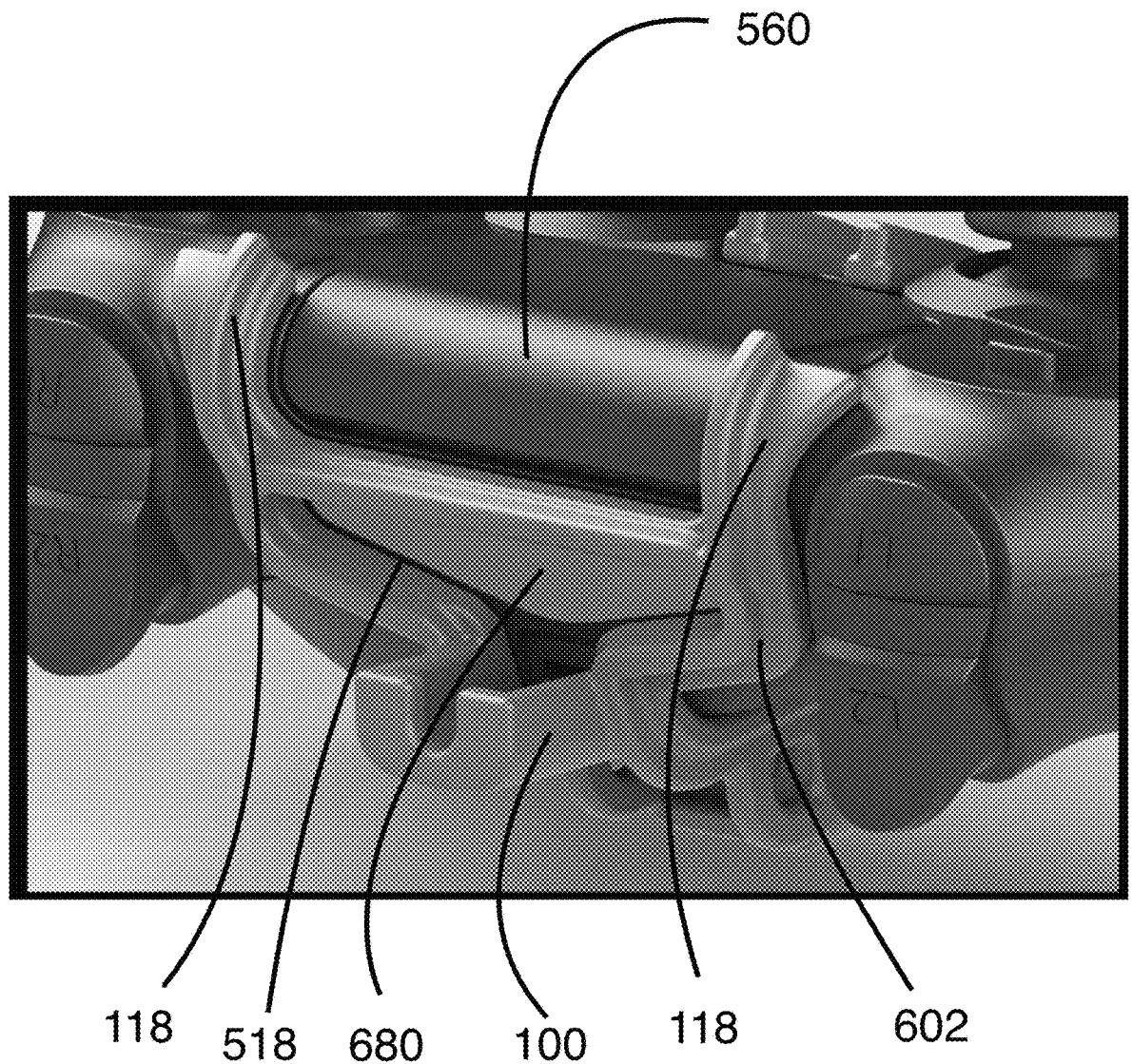
FIG. 6 shows a rear facing view of the modular video game controller security bracket apparatus showing an opening in the rear facing bracket of the modular security bracket apparatus wherein the opening allows a lighted output of the video game controller to be emitted therefrom.

FIG. 6 shows a rear facing view of the modular video game controller security bracket apparatus 300 described above showing an output opening 518 in the rear facing bracket 602 of the modular security bracket apparatus 100. The rear facing bracket 602 includes the rear facing attachment prongs 118 and the output opening 518 formed in between the prongs 118. The output opening 518 allows a lighted or infrared electromagnetic radiation 680 of the video game controller 560 (or other electronic device) to be emitted from the modular security bracket apparatus 100 without any interruption to the transmission thereof. As noted above, this aspect of the modular security bracket apparatus 100 allows the device that it secures to be used without any hinderance or interference by the modular video game controller security bracket apparatus.

CONCLUSION

A number of advantages are offered by the present modular security bracket methods and apparatus such easy accommodation of and securing to the most popular video game controllers, ease of installation and removal of the modular security brackets, and additional protection of the video game controllers from loss and theft. The modular security bracket methods and apparatus can be designed to accommodate and secure virtually any relatively small sized ("hand-held" sized) electronic device such as, for example, a remote control device for a television, stereo system, and the like. The modular security bracket apparatus can be used to secure both wired and wireless video game controllers and other similarly sized electronic devices.

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. A modular security bracket for use with video game controllers and other electronic devices, comprising:
   (a) a front facing security bracket designed and shaped to attach firmly to a front facing part of a video game controller or other electronic device wherein the front facing security bracket includes at least one front facing attachment prong designed to hold the front facing part of the video game controller or electronic device firmly in place within an interior of the modular security bracket;
   (b) a rear facing security bracket designed and shaped to attach firmly to a rear facing part of the video game controller or to a rear facing part of the electronic device, wherein the rear facing security bracket includes at least one rear facing attachment prong designed to hold the rear facing part of the video game controller or the rear facing part of the electronic device firmly in place within the interior of the modular security bracket; and
   (c) a tethered security cable having a first end, wherein the first end of the security cable is inserted through cable channels formed in the front and rear facing security brackets, and wherein, after assembly of the modular security bracket, the tethered security cable is prevented from removal from the assembled modular security bracket;
   wherein the front facing security bracket and rear facing security bracket are securely attached and affixed together and to the video game controller or the electronic device; and wherein the tethered security cable has a second end, and wherein the second end of the security cable is attached to a fixed surface or a relatively immovable object, thereby preventing the video game controller or the electronic device, and the modular security bracket from being lost or stolen.

2. The modular security bracket of claim 1, further comprising:
   (d) at least one insert screw sleeve adapted for insertion within an associated and corresponding mounting insert hole formed in the front facing security bracket, wherein the insert screw sleeve has "female" screw grooves formed within its interior diameter; and
   (e) at least one security bracket screw, associated and corresponding to the at least one insert screw sleeve, the security bracket screw having "male" screw grooves along its exterior diameter, wherein the female screw grooves of the associated and corresponding insert screw sleeve are sized to mate with the "male" screw grooves of the security bracket screw, and wherein during assembly of the modular security bracket, the security bracket screw is inserted through a through hole formed in the rear facing security bracket and screwed together with the associated and corresponding insert screw sleeve thereby attaching and affixing the front and rear facing security brackets firmly together and to the video game controller or the electronic device.

3. The modular security bracket of claim 2, wherein the insert screw sleeve includes knurling grooves along its exterior to prevent intentional or inadvertent removal of the insert screw sleeve from its associated and corresponding mounting insert hole.

4. The modular security bracket of claim 3, wherein the knurling grooves also prevent destruction of the front facing security bracket, the associated and corresponding mounting insert hole, or its surrounding plastic material.

5. The modular security bracket of claim 2, wherein the at least one insert screw sleeve comprises a plurality of insert screw sleeves adapted for insertion into associated and corresponding mounting insert holes formed in the front facing security bracket.

6. The modular security bracket of claim 5, wherein the at least one security bracket screw comprises a plurality of security bracket screws, each security bracket screw having "male" screw grooves along its exterior diameter, and wherein each security bracket screw is screwed into its associated and corresponding insert screw sleeve during assembly of the modular security bracket.

7. The modular security bracket of claim 2, wherein the security bracket screw includes a custom-shaped screw head, and wherein the custom-shaped screw head prevents unauthorized disassembly of the modular security bracket.

8. The modular security bracket of claim 7, wherein during assembly of the modular security bracket, the security bracket screw is screwed into the insert screw sleeve using a custom-shaped screw head tool that is specifically shaped to accommodate the shape of the custom-shaped screw head.

9. The modular security bracket of claim 1, wherein the front facing and rear facing security brackets are designed to attach firmly to a hand-held electronic device, and wherein the security brackets are assembled together to securely and firmly hold the hand-held electronic device within the interior of the modular security bracket.

10. The modular security bracket of claim 1, wherein the tethered security cable comprises galvanized steel with a hardened vinyl covering.

11. The modular security bracket of claim 1, wherein the tethered security cable comprises ⅛" aircraft quality steel braided material.

12. The modular security bracket of claim 1, wherein the second end of the tethered security cable has a security eyelet attached thereto, wherein the eyelet is used to attach the second end of the tethered security cable to the fixed surface.

13. The modular security bracket of claim 12, wherein the eyelet is attached to the fixed surface using a security screw.

14. The modular security bracket of claim 1, wherein the front and rear facing security brackets comprise injected molded plastic infused with glass fiber for improved strength.

15. The modular security bracket of claim 14, wherein the front and rear facing security brackets are infused with different percentages of glass fiber thereby varying the relative strength and flexibility of the front and rear facing security brackets.

16. The modular security bracket of claim 1, wherein the video game controller is used to control a PlayStation™ video game console.

17. The modular security bracket of claim 1, wherein the video game controller is used to control an Xbox™ video game console.

18. The modular security bracket of claim 1 wherein the modular security bracket permits unhindered and uninterrupted access to the video game controller and to its associated video game user interactive mechanisms.

19. The modular security bracket of claim 18, wherein the modular security bracket further includes an output opening that allows light or infrared electromagnetic radiation output by the video game controller to be received by a video game console or other input device.

20. A modular security bracket for use with video game controllers and other electronic devices, comprising:

a. a front facing security bracket means for firmly securing to a front facing part of a video game controller or other electronic device, wherein the front facing security bracket means includes at least one front facing attachment prong means for holding the front facing part of the video game controller or electronic device firmly in place within an interior of the modular security bracket;

b. a rear facing security bracket means for firmly securing to a rear facing part of the video game controller or to a rear facing part of the electronic device, wherein the rear facing security bracket means includes at least one rear facing attachment prong means for holding the rear facing part of the video game controller or the rear facing part of the electronic device firmly in place within the interior of the modular security bracket;

c. a tethered security cable means for securing the modular security bracket, the tethered security cable means having a first end, wherein the first end has a security cable stop means affixed thereto, and wherein, prior to assembly of the modular security bracket, the first end of the security cable means and the security cable stop means is inserted through cable channels formed in the front and rear facing security bracket means, and wherein, after assembly of the modular security bracket, the tethered security cable means is prevented from removal from the assembled modular security bracket by the security cable stop means;

d. at least one insert screw sleeve means for securing a screw therein, wherein the insert screw sleeve means is adapted for insertion within an associated and corresponding mounting insert hole means formed in the front facing security bracket means, and wherein the insert screw sleeve means has "female" screw grooves formed within its interior diameter; and e. at least one security bracket screw means for mating with the insert screw means, associated and corresponding to the at least one insert screw sleeve means, the security bracket screw means having "male" screw grooves along its exterior diameter, wherein the female screw grooves of the associated and corresponding insert screw sleeve means are sized to mate with the "male" screw grooves of the security bracket screw means, and wherein during assembly of the modular security bracket, the security bracket screw means is inserted through a through hole formed in the rear facing security bracket means and screwed together with the associated and corresponding insert screw sleeve means thereby attaching and affixing the front and rear facing security bracket means firmly together and to the video game controller or the electronic device;

and wherein the tethered security cable means has a second end, and wherein the second end of the tethered security cable means is attached to a fixed surface thereby preventing the video game controller or the electronic device, and the modular security bracket from being lost or stolen.

21. A method of securing a video game controller or other electronic device from theft or loss, comprising:

(a) securing a front facing security bracket to a front facing part of a video game controller or other electronic device, wherein the front facing security bracket includes at least one front facing attachment prong designed to hold the front facing part of the video game controller or electronic device firmly in place;

(b) securing a rear facing security bracket to a rear facing part of the video game controller or the electronic device, wherein the rear facing security bracket includes at least one rear facing attachment prong designed to hold the rear facing part of the video game controller or the rear facing part of the electronic device firmly in place;

(c) attaching the front facing security bracket to the rear facing security bracket thereby forming an assembled modular security bracket apparatus having an interior, and thereby securing the video game controller or the electronic device within the interior of the assembled modular security bracket; and (d) tethering the assembled modular security bracket apparatus to a relatively immovable object or stable surface, thereby preventing theft or loss of the video game controller or the electronic device, and the assembled modular security bracket.

\* \* \* \* \*